Dec. 22, 1970  F. A. PURDY  3,548,619
VEHICLE-BORNE UNLOCKER OF COMBINATION-LOCK
Filed Nov. 1, 1968
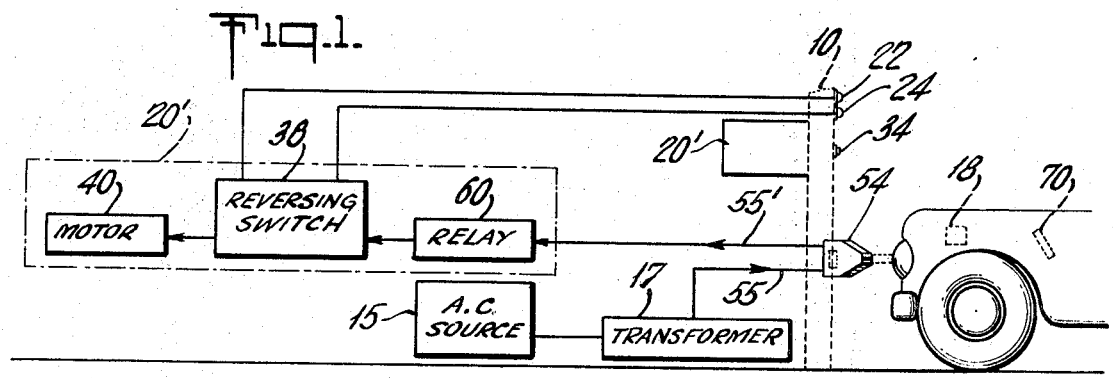
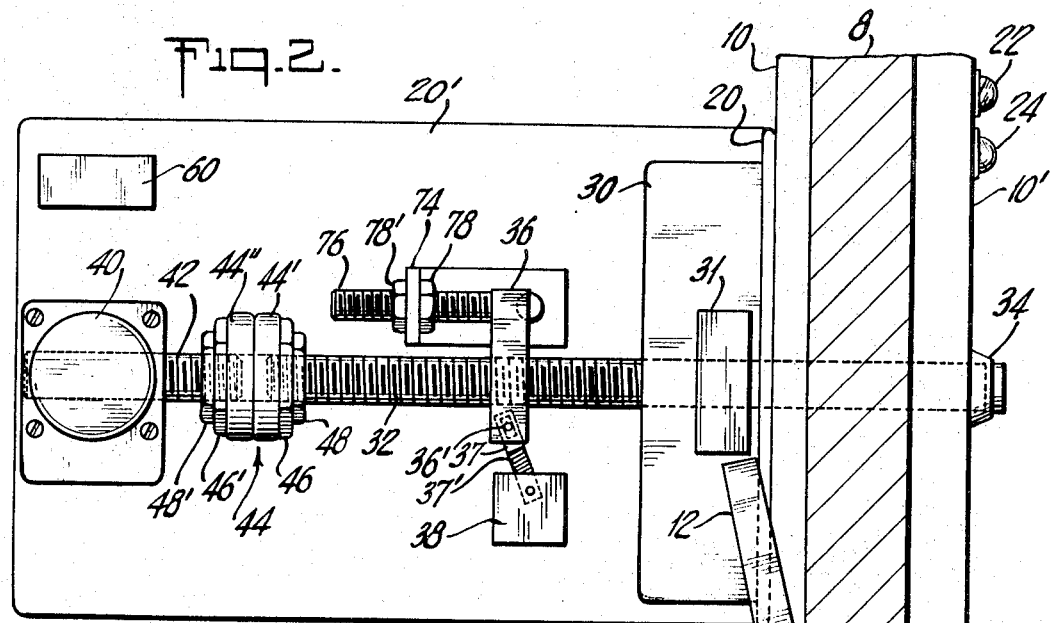
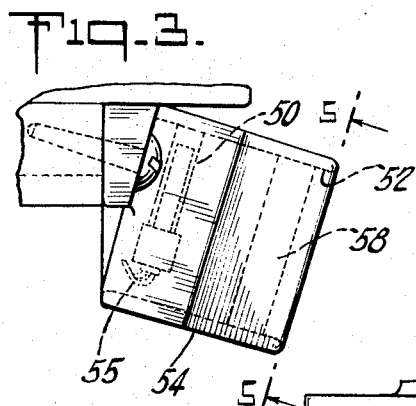
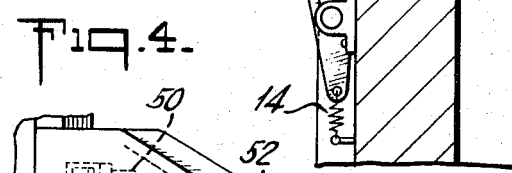
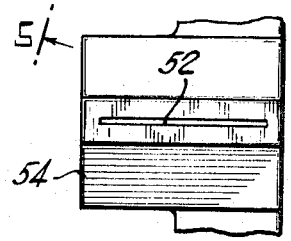
INVENTOR
FREDERICK A. PURDY United States Patent Office 3,548,619
Patented Dec. 22, 1970

3,548,619
VEHICLE-BORNE UNLOCKER OF COMBINATION-LOCK
Frederick A. Purdy, 870 United Nations Plaza, New York, N.Y. 10017
Filed Nov. 1, 1968, Ser. No. 772,763
Int. Cl. E05b 43/00
U.S. Cl. 70—267
12 Claims

ABSTRACT OF THE DISCLOSURE

An operator for driving a garage-door open or closed, a door held closed and bolted by a combination-lock as used on doors of safes and vaults, is unlocked by projecting from the headlamp of an automobile timed beams of light onto a semi-conductor. The timing is synchronized with rotations of "tumbler"-discs having numerals adopted for the combination. The numerals and their order of ocurrence are subject to change by the owner of the automobile, as for any safe or vault permitting access by the owner's automobile to the exclusion of automobiles of others, and in contravention of rays from the sun, from ambient daylight, and from light of all kinds, intentional or sporadic.

THE ART

Various means of opening garage-doors from the headlamp-beam of an automobile have been made or patented. My several patents, and applications for patents, using the headlamp-beam, commenced with Pat. No. 2,876,002, filed Aug. 2, 1955, issued Mar. 3, 1959. And they have continued through several patents, and through several applications currently before the U.S. Patent Office. But none of mine, earlier than the instant application, and, to the best of my knowledge, none of the others, presents a combination-lock responding to the headlamp-beam of one particular automobile, so that, as to unlocking the door, the owner's garage is equipped as well as the average bank-safe. An object of the instant invention is to afford such exclusiveness to each user.

Another object is a simplified capsule of reduced size on the door-frame within which a semi-conductor cell is exposed to the headlamp-beam.

Other objects will appear as the specification progresses.

My co-pending patent-application Ser. No. 401,264, filed Oct. 2, 1964 and now U.S. Pat. No. 3,444,344, in its specification and in its 15 figures on 7 sheets of drawings, extensively depicts the operator into which the instant invention may be introduced.

DRAWINGS

A preferred embodiment of the invention is shown in the accompanying drawings.

FIG. 1 is a schematic illustration of an automobile headlamp as a communication means from vehicle to a motor-energizing train of elements at the garage.

FIG. 2 is an assembly of components on doorway-wall to one side clear of doorway.

FIGS. 3, 4, and 5 are respectively, a top view, a side view, and a head-on view, of a capsule on doorway-frame.

WORKING A COMBINATION-LOCK

The inter-related order of lock-parts in a combination-lock is shown in patents to Robert W. Maynard, Number 3,038,325 issued June 12, 1962; Number 3,106,083 issued Oct. 8, 1963; and 3,111,022 issued Nov. 19, 1963; and in a patent to Anthony J. Potzick. Number 3,073,145 issued Jan. 15, 1963, both patentees being assignors to Mosler Safe Company. My invention lies in general outside the combination-lock described in these patents.

The generally used combination-lock is opened in four stages of hand-turning on a dial. In the first stage there are four revolutions needed, to bring into register with an "index-mark" that is stationary above the dial, that one of the numerals around the dial which corresponds to the first of three numerals adopted for the combination; then three revolutions in the opposite direction of rotation to bring into register the second of the adopted numerals; then two revolutions in the first direction of rotation to bring into register the third of the adopted numerals; then oppositely in a part of a revolution, to retract the bolt that has held the door locked. Each of three stages of turning sets one of three respective "tumbler"-discs within the lock, then the fourth (final) turning brings a "driver" into retraction of the bolt.

If the first of these four stages is counter-clockwise, (it may be clockwise at manufacturer's preference), the second stage will be in the opposite direction, clockwise; the third stage counter-clockwise; and the fourth clockwise.

The dial comes to the end of the first stage of turning when the combination's first numeral has passed the index-mark in three revolutions and has reached the index-mark for the fourth time; then for the second stage it turns oppositely and stops when the second numeral has reached the index-mark for the third time; then in the other direction for the third stage to reach the index-mark the second time with the third numeral; finally, fourth stage, oppositely to draw the locking bolt clear to free the door to open quoting from Maynard Pat. 3,111,022, column 3, lines 67, 68, 69: "As the driver 17 is then turned, the dog 57 will be pulled (to the left in FIG. 2) with it, drawing in the bolt 37."

In my invention, this routine is performed by a motor under the timed control of an escapement.

COMPONENTS ESSENTIAL TO THE INVENTION

For mounting components in positions relative to the combination-lock, a panel 20 is held to one side of the interior of the doorway wall 10, clear of the doorway; and a branch-panel 20' is formed integrally at a right angle from panel 20.

An encased combination-lock mechanism 30 has a bolt 31 normally extending in locking position out from the case towards the reader of FIG. 2, and has the lock's "arbor" 32 reaching through the garage-wall, or through the doorway-framing, to an outdoors manually operated dial 34 for convenient unlocking by hand from outside the garage.

A latch 12 pivotally carried on door 8, is biased by spring 14 to engage under the bolt 31; thus to pinion the door firmly against rising with a direct hand-hold. To open the door, bolt 31 must be drawn inwardly of case 30, by hand on dial 34 of the combination-lock or on the automobile dashboard time-meter 70 through the headlamp-beam, later described herein.

The inward end of arbor 32 extends leftward of FIG. 1 to a friction-coupling 44, driven by the drive-shaft 42 of an electrically powered small 12-volt reversible induction motor 40 (anchored to branch-panel 20') geared to reduce speed preferably to 30 revolutions per minute (one revolution each two seconds).

Friction-coupling 44 consists of two identical discs 44' and 44" of resilient plastic, of rubber, or of other brake-material facing, hollow in the middle to fit on arbor 32 and on shaft 42, held in contact face-to-face by the anchorages of lock-casing 30 and arbor-motor 40 respectively onto panels 20 and 20', pressed into mutual contact-friction adjustably by threaded pressure-discs 46 and 46', and locked on respective arbor 32 and shaft 42 by locknuts 48 and 48'. Fastened to branch-panel 20' is a right-angle bracket 74 carrying a stop-screw 76 adjustable in its reach leftward or rightward of FIG. 2. Purpose of the stop-screw will be observed under caption OPERATION.

Two pilot lights, 22 green and 24 red, are wired to respective stationary electrodes at reversing-switch 38, so that when the armature has been thrown to make contacts with one pair of stationary electrodes the green pilot-light will indicate to auto-driver that the next rotation of motor 40 will be counterclockwise; or the red pilot-light will indicate a setting to rotate motor 40 clockwise.

Between the case 30 and friction coupling 44, arbor 32 is threaded to effect movements by a threaded traveling nut 36, along the arbor alternatively and rightward of FIG. 2. A pin 36' through the lower reach of nut 36 engages an oblong hole in the handle 37 of a reversing-switch 38, so that in the nut's movement in either direction along arbor 32 the nut at a suitable moment after handle 37 is beyond center throws reversing switch 38 to bring each of the motor's "field-leads" into contact with a "line-supply" terminal that has a polarity opposite to that in the preceding actuation, so that at the motor's next energization its rotation will be, for example, counterclockwise instead of clockwise. A tension-spring 37' makes up a part of handle 37. Energization of motor 40 occurs while light is made to bear effectively upon semiconductor 50.

Semi-conductor 50, FIGS. 3 and 4, has the property of restricting the flow of electric current when darkened, and increasing the flow when lighted. For economy it is of cadmium-sulphide, hermetically sealed within glass to avoid swelling and bursting from water-vapor dampness in the atmosphere. Semi-conductor 50 is held in a capsule 54 attached by screws to the door-framing or to the masonry of the garage-structure. The capsule is uniformly shaped above and below its center-line 56, FIG. 4, so that it may be turned upside-down for attaching to a structure at one side or other of the doorway. In position at either side it inclines 15° inwardly of the driveway to effectively receive the core of a headlamp-beam 15 to 20 feet away from the doorway-framing. Characteristics of this capsule are the width of the aperture 52, on the order of 1¼", to receive the beam from a wide range of head-lamp positions; and the experimentally studied and determined narrow height of the aperture is on the order of one thirty-second of an inch, to restrict undue entry of the ambient daylight, of sunlight rays from above, or reflections of light by snow from below. A filter 58 closes aperture 52 for preventing accumulation of dust, and for restricting passage of light-rays having frequencies in the visible daylight region of the radiant spectrum, and for admitting passage through it of light rays having frequencies in a selected non-visible region of the spectrum. Two insulated wires, 55 and 55', from semi-conductor 50, go through holes bored inward of the garage through wood-trim, or through doorway-framing, or through masonry.

House current at 110 volts, is reduced by transformer to 12 volts shown as 203 in my co-pending application 401,264, now U.S. Pat. No. 3,444,344 and in that application, as in this, passes through a semi-conductor 23, here designated 50. A motor-energizing train of elements carries from an alternating current source 15, through transformer 17, semi-conductor 50, relay 60, and reversing switch 38, to motor 40.

The armature of relay 60 normally holds the circuit open, but when semi-conductor 50 is lighted from the headlamp-beam, as a communication means from vehicle to garage, to energize the coil of relay 60, the circuit is closed to conduct current at 12 volts to motor 40, and to immediately and continually energize motor 40 throughout the period of exposure of semi-conductor 50 to the headlamp-beam.

On the dashboard of the automobile is a time-meter 70 with externally a finger-grip-ridge and graduated face integral, and internally an escapement-train of toothed wheels, to be invested with actuation-energy by hand-turning against resistance of a spring. The face of time-meter 70 is graduated in seconds per minute of time, otherwise it is substantially in the design of the "minute-minder" (graduated in minutes per hour) (as made by Lux Time Division of Robertshaw Controls Co., at Waterbury, Conn.).

OPERATION

Time-meter 70 opens and closes a circuit of 12-volt electric current from the automobile-battery 18 to the automobile headlamp. After each positioning of the graduated face, and the ensuing escapement-run, time-meter 70 opens the circuit to stop motor 40, then shortly following the stopping, re-closes the circuit and re-energizes the motor 40, corresponding to the need in the combination lock to so rotate the tumblers and driver as to withdraw the lock-bolt 31 at the final stage and permit the door to open under its drive by the door-drive motor.

Within time-meter 70, the winding-turn by hand elevates the hammer into potential "bell-ringing" position, lifting the hammer clear of button in a normally closed miniature electric switch (12 volts), thus closing the circuit from battery to headlamp. When, at the end of the prescribed time the bell-ringing hammerhead is released automatically by the escapement, the hammer-head depresses the switch-button, the circuit battery-to-headlamp is opened, the headlamp is extinguished, the motor 40 at the lock is stopped, and the gate of the first tumbler is in a position relative to other tumblers, a position that it will not lose as the "dialing" progresses. Concurrently with the stopping of motor 40, by extinguishment of headlamp-beam, the reversing switch is thrown by the traveling nut 36 on arbor 32 so that motor 40, at its next energization with the re-lighting of headlamp-beam, will rotate in the reverse direction needed by the combination-lock.

At stoppage of the headlamp-beam and motor 40, a hiatus of time occurs pending the auto-driver's next setting (second, third, or fourth) of the time period on the graduated face of time meter 70. The needs of the combination-lock are not affected by the duration of the hiatus.

There are values in resorting to interruption—hiatus in periods of time, especially as we are dealing here with fractions of a second.

(a) The auto-driver needs time to twist his wrist in order to bring thumb and fingers into position for a new grasp of the finger-grip-ridge to apply a succeeding prescribed distance of timer-face setting.

(b) The auto-driver may need time to verify that he is correct in extent of varying settings.

(c) The motor needs time to come to a stop if it is to reverse its direction of rotation, as between clockwise and counterclockwise. Motors have a tendency to coast after electric current has been shut off. A characteristic of a money-saving simple motor such as noted in this text, page 4, line 14, is that it does not respond to a quick spring-like throw of a reversing switch. It continues its run under momentum (1725 r.p.m.) until it encounters a heavy load or its rated speed may have time to fall off. In a device which depends on snap-reversal, as from clockwise to counter-clockwise, a choice of motor needs to be made, usually at a disadvantage in price.

In hand-dialing practice the four revolutions prescribed for the first counter-clockwise phase of the first stage may be exceeded without limit. The dial may be revolved a dozen times or a hundred. Four revolutions or more put tumbler No. 1 into its proper relationship to the other tumblers; this relationship it will retain throughout the dialing. It is only at this first stage of the "dialing" that an exception can be made to the rule that the prescribed number of revolutions must be strictly observed.

A cashier at a safe-door has an advantage over an auto-driver. The cashier can see from the start that he is registering the numerals properly at the index-mark. The auto-driver has only the headlamp beam; a time period; and two pilot-lights, green and red, at the door-frame, indicating that the position of the reversing-switch is in order for correct direction of rotation by motor 40 at next energization.

Numbers of persons by habit will toy with any object that is conveniently at hand. This can be the case at outdoors dial 34. The auto-driver needs recourse, despite indiscriminate dislocations of tumblers and otherwise, to a re-setting procedure that ensures a dialing-start with the first numeral of the combination in register with the index-mark.

It may be noted further that of the four revolutions counter-clockwise in the first stage, a movement leftward of FIG. 2 is made by nut 36, equivalent to the breadth of four threads on arbor 32. In the second stage, three revolutions clockwise, nut 36 becomes retracted by all but the breadth of one thread. And, in the third stage, by one more thread.

This could bring a gradual creeping by nut 36 leftward with each unlocking of the door, conflicting, with limiting effect, upon handle 37 of reversing switch 38. And the fourth stage to unlock by drawing the belt 31 inward of case 30 does not require even one full revolution; there being no tumbler to set, but a bolt to draw. To have a correct "dialing-start" at the time of one's next setting out to unlock a bolted door, it is necessary to have the first numeral of the combination in register with the index-mark.

Recourse is afforded by the unlimited number of revolutions allowed at the first stage, noted on page 9, line 3 herein.

Stop-screw 76, pre-adjusted to limit movement of nut 36 leftward of FIG. 2, resists over-runs of motor 40, so that these are cancelled by slippage at friction-coupling 44.

Accordingly, the auto-driver will at start-out make quarter circle turns of the graduated face of time-meter, to the extent of producing at least four, possibly five or six, hiatus-separated revolutions of tumbler No. 1, and thereafter proceed with the second stage of the "dialing" through motor 40.

Thus it is provided that the invention re-adjusts itself through the friction-coupling before completing the dialing to open the door.

At the adoption of numerals for the combination, or at a change to a new set of numerals, stop-screw 76 is adjusted to stop the turning of tumbler numbered 1, when its combination-number reaches and registers with the index-mark. At the same change of numerals a time-period for a complementary setting of time-meter 70 is to be calculated and put on record for the auto-driver. Specifications for the setting of time-meter are made also for the second, third, and fourth stages. Such specifications could include a degree of over-run for motor, to cancel at the friction-coupling. A slight over-run inaccuracy is accommodated by the thin "fence" which enters the "gates" when all three gates are in line. (Nomenclature adopted from Maynard Pat. 3,111,022, issued Nov. 19, 1963.)

Motor 40, rotating at 30 revolutions per minute, one revolution each two seconds, goes through four revolutions in eight seconds, this time-period being roughly that needed to complete the first stage in setting of tumbler No. 1 within combination lock 30, corresponding to the first numeral of the three adopted for the combination. For the three other stages (two more for tumblers and a final for the driver that ends by drawing in the lock-bolt to open the door) there will be four complementary numbers set for the guidance of the auto-driver as to the points at which he or she will set the time-meter 70 to allow the time-period needed, one period at a time, for motor 40 to make its respective revolutions, translating time at the meter into distance of turn at the tumbler.

The auto-driver sets time-meter 70 four or more times to effect the four or more revolutions counter-clockwise in the first stage of working the combination-lock. Graduating the eight seconds around the face of time-meter 70 permits two seconds at each quarter of the circle. This allows for coarse graduations in which one-eighth of the circle would represent one second, and a quarter of that easily marks off a quarter of a second. Thus a setting of any prescribed time-period can be made with ease, and inaccuracies will not be great in time-setting by an un-practiced hand.

Beyond the first stage, there are, for the second stage, three successive settings of time-meter 70; for the third stage, two settings; for the fourth stage, one setting. Thus there are, in total, ten settings—time required to open the door, could be half a minue for a skilled auto-driver.

REVIEW OF OPERATION FOR THE TIME-SAVING READER

In FIG. 2, the parts appear as having been brought to the end of the first stage of motor's "dialing." Nut 36 has been prevented by stop-screw 76 from moving farther to the left. Any excess of revolving by the motor has been cancelled by slippage at friction-coupling 44. The adjustment of reach by stop-screw 76 as originally made ensures that the first numeral in the combination registers with the index-mark. The setting of tumbler No. 1 has thus been completed, and it will continue in holding that relation to the two other tumblers and the driver, as these go into their stages of revolutions to line up the "gates" so that the three tumblers admit the "fence" of the driver. The second stage of the "dialing" by motor 40 is ready to be entered, three clockwise revolutions—clockwise as would be seen by a person outside the doorway jamb. The position of the handle of reversing-switch has been brought leftward of FIG. 2 in the leftward progress of the four revolutions in the first stage of "dialing," so that the polarity of the motor when motor is next energized by current admitted through semi-conductor 50 and relay 60, when headlamp-beam is again brought to light up semi-conductor 50, will be the reverse of the polarity in the first stage, now at its end. In that polarity the direction of rotation of motor 40 will be clockwise. The clockwise rotation will draw traveling-nut 35 rightward of FIG. 2.

As has been observed, the preponderance of counter-clockwise revolutions, as against clockwise, will tend to bring nut 36 leftward of FIG. 2, so that a stop-screw at the rightward extremity of bracket 74 is not shown, although a rightward-end flange at a right-angle from panel 20' could be shown, and could carry a stop-screw.

Since, as noted, page 7, line 21, the miniature switch within the time-meter is normally closed, time-meter 70 when at zero cooperates to hold the circuit closed battery to headlamp.

Any use of time-meter occurs only when the automobile is within about 20 feet distance from doorway, except for which all uses of the one headlamp are free of interference, and the other headlamp is at no time affected.

I claim:

1. In a door-operator for a garage, a combination-lock for locking the door, a motor for impelling movements of lock-parts, a motor-energizing train of elements at the garage comprising an alternating current source, a semi-conductor in capsule at door-frame, for increasing flow of current when lighted as by a headlamp beam of a vehicle, a relay and a reversing-switch leading to said motor; communication means at a vehicle comprising a head-lamp, a battery, a circuit battery-to-headlamp, a time-meter in said circuit including an escapement for measuring periods of time, and for translating said periods of time with extent of said impelling movements by said motor, for matching into unlocking needs at said combination-lock.

2. The combination of claim 1 with a dial at door-frame for unlocking by hand.

3. The combination of claim 1 with a tension-spring as part of the handle of reversing-switch.

4. The combination of claim 1 with a pilot-light at the garage for guidance of the auto-driver.

5. In a door-operator, a door, a combination-lock with a bolt for holding said door locked against opening, lock-parts subject to movements in an inter-related order for moving said bolt to unlock said door, a motor and motor-energizing train of elements for applying said movements in said order, a vehicle having a headlamp, a battery, a circuit battery-to-headlamp, a time-meter in said circuit for closing and opening said circuit in timed relation to said movements of parts at said lock, and communication means by said headlamp to said motor-energizing train of elements synchronized with the said inter-related order at the combination-lock.

6. In a door-operator, a door, a combination lock with bolt for holding said door locked against opening, lock-parts subject to movements in an inter-related order for moving said bolt to unlock said door, a motor and motor energizing train of elements for applying said movements in said order, a vehicle having a headlamp, a battery, a circuit from battery to headlamp, a time-meter in said circuit for closing and opening the circuit in timed relation to said movements of parts within said lock, and communication means by said headlamp to said motor-energizing train of elements within the garage synchronized with the said inter-related order at the combination lock.

7. In a garage door-operator a combination-lock for locking the door, a system in said combination-lock for unlocking by movements of parts, a motor for impelling said movements of parts, a motor-energizing train of elements at the garage, communication means at a vehicle including a headlamp, a battery, a circuit battery to headlamp, a time-meter in said circuit including an escapement for measuring periods of time and means for synchronizing said periods of time with extent of said impelling movements by said motor, for matching into said unlocking system at said combination-lock.

8. In a door-operator, a door, a combination-lock as used on doors and safes and vaults, said lock having means for holding said door locked, and having lock-parts inter-related in a prescribed order of direction and time for unlocking, a motor timed in revolutions per minute for impelling door-unlocking movements of said lock-parts; a motor-energizing train of elements at the garage; means at a vehicle for controlling said movements of said lock-parts including a headlamp, a lighting source for the headlamp, and a time-meter having an escapement for measuring periods of time, and having means for setting of said periods in said prescribed order of direction and time for unlocking.

9. The combination of claim 8 with a hand-operated dial for unlocking the door as regularly done at doors of safes and locks.

10. In a door-operator, a door, a combination lock as used on doors of safes and vaults, for locking said door, said combination-lock having a series of rotatably movable tumblers inter-related as to positioning for unlocking, a rotatable motor for impelling said positioning of said tumblers, the several tumblers, except the first, being limited as to the number of revolutions each may make in said inter-related positioning, a friction-coupling for cancelling by slippage irregularities in said inter-related positioning of parts, and a first tumbler unlimited as to allowable revolutions, for establishing correct conditions in dislocated parts, and for ensuring unlocking operability.

11. The combination of claim 10 with an index-mark to indicate correctness of said positioning, a stop adjustable in relation to the first numeral selected for the combination, for ensuring in the said inter-related positioning of parts the correct register of the said numeral at said index-mark at the completion of the first stage of dialing by motor.

12. In a door-operator, a door, a combination-lock as used on doors and safes and vaults, said lock having means for holding said door locked, and having lock-parts interrelated in a prescribed order of direction, of time, and of essential interruptions within time, for unlocking, a motor timed in revolutions per minute for impelling door-unlocking movements of said lock-parts; a motor-energizing train of elements at the garage; means at a vehicle for controlling said movements of said lock-parts including a headlamp, a lighting source for the headlamp, and a time-meter having an escapement for measuring periods of time, and having means for setting of said periods in said prescribed order of direction, of time, and of essential interruptions within time, for unlocking.

References Cited

UNITED STATES PATENTS

| | | | |
|---|---|---|---|
| 2,859,960 | 11/1958 | Magondeaux | 49—25 |
| 2,876,002 | 3/1959 | Purdy | 49—25 |
| 2,879,657 | 3/1959 | Eichberg | 70—267 |
| 2,986,689 | 5/1961 | Hofer | 318—480 |
| 3,036,256 | 5/1962 | Purdy | 318—480 |
| 3,017,763 | 1/1962 | Weil | 70—269 |

MARVIN A. CHAMPION, Primary Examiner

R. L. WOLFE, Assistant Examiner

U.S. Cl. X.R.

49—25; 70—271, 279; 318—480